Sept. 14, 1965   W. C. HAZEN ETAL   3,206,288
APPARATUS AND METHOD FOR CONTACTING LIQUIDS WITH LIQUIDS
Original Filed Jan. 6, 1958   2 Sheets-Sheet 2
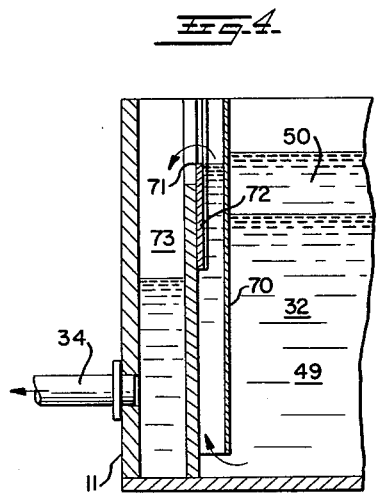
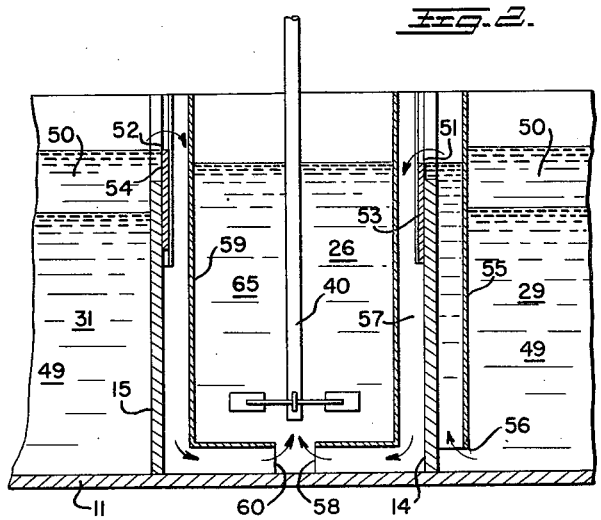
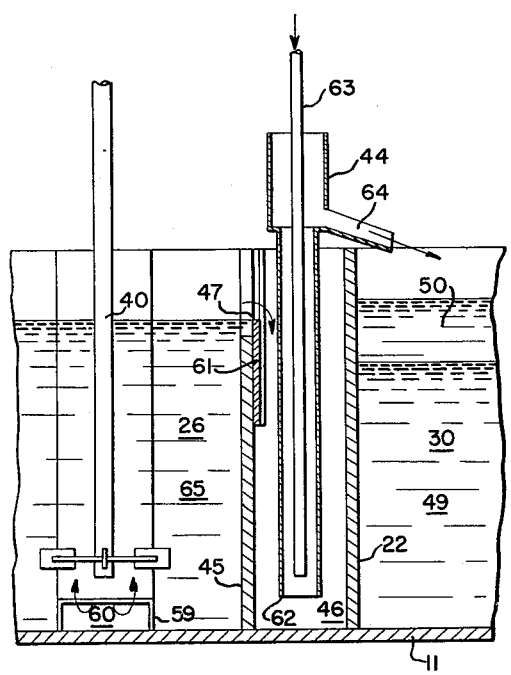
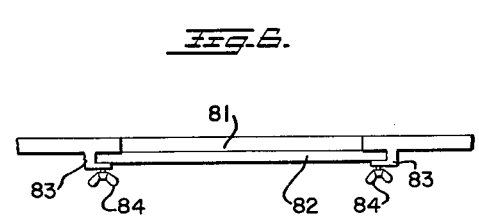
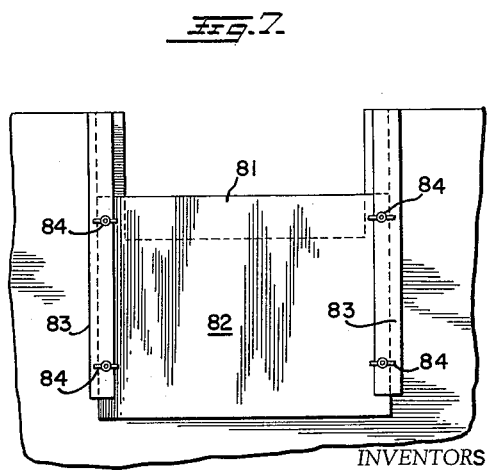
INVENTORS
WAYNE C. HAZEN
ROBERT L. CLINE
BY Shanley & O'Neil
ATTORNEYS

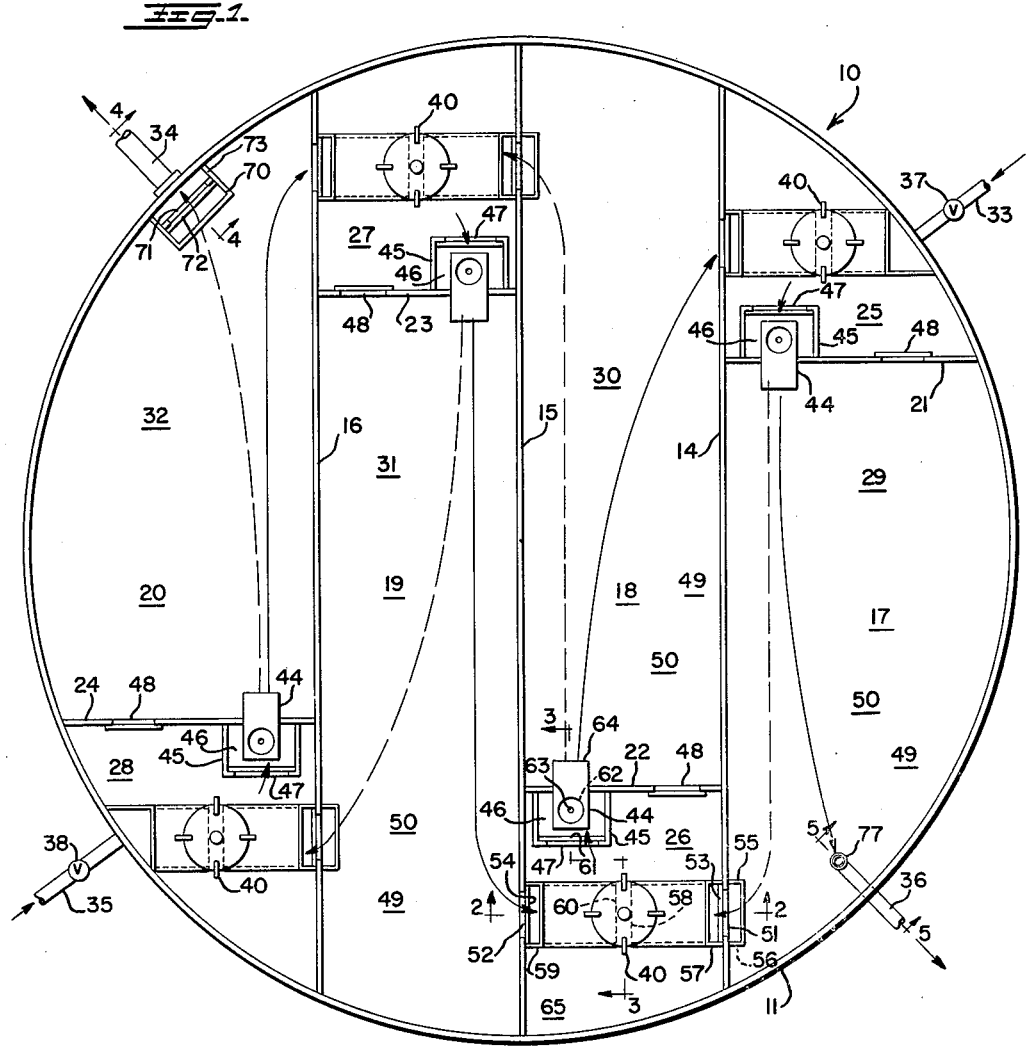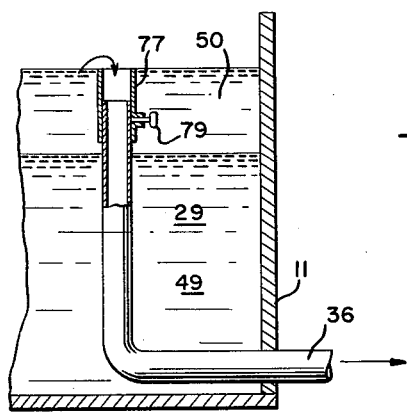

United States Patent Office 3,206,288
Patented Sept. 14, 1965

3,206,288
APPARATUS AND METHOD FOR CONTACTING LIQUIDS WITH LIQUIDS
Wayne C. Hazen, Golden, Colo., and Robert L. Cline, Teheran, Iran, assignors to Kerr-McGee Oil Industries, Inc., a corporation of Delaware
Continuation of application Ser. No. 707,368, Jan. 6, 1958. This application Apr. 3, 1962, Ser. No. 199,208
10 Claims. (Cl. 23—310)

This application is a continuation of United States patent application Serial No. 707,368, filed January 6, 1958 and now abandoned.

This invention relates to improved liquid-liquid contacting apparatus of the multistage mixer-settler type, and to a method of contacting liquids with liquids.

The apparatus and method to be described hereinafter may be used wherever it is desirable to intimately contact two immiscible or substantially immiscible liquids of different specific gravities. For example, the apparatus and method described herein may be used to accomplish the removal, partial removal or concentration of one or more components contained in one of such liquids with the aid of the second liquid, as in washing operations, chemical treating operations, or solvent extractions. The apparatus and method of the invention are particularly effective and desirable in hydrometallurgical processes such as in the solvent extraction of aqueous leach liquors with an organic extractant for the purpose of concentrating metal values contained in the leach liquor. The resulting loaded organic extractant may be stripped with a suitable stripping agent to produce a concentrate of metal values. Then, if necessary, the concentrate of metal values thus obtained may be further processed to obtain a commercial product of the metal values.

Numerous attempts have been made heretofore to design a multiple unit horizontal extractor of the mixer-settler type having driven agitators. However, all of such prior art extractors have inherent disadvantages and limitations. For example, many of the prior art extractors are dependent upon the tilt of the apparatus to achieve liquid flow, or require a large number of conduits for transfer of the liquids, or are of an unduly complicated design in other respects, any and all of which unnecessarily increase the cost of manufacture. Also, it has not been possible heretofore, without elaborate controls, to obtain a desired volume ratio of the two liquids while in the individual mixing zones which varies substantially from the volume ratio fed to the extraction apparatus. This is of importance in many solvent extraction processes using a lighter liquid such as an organic solvent to extract a heavier liquid such as an aqueous leach liquor. In such processes, it is often desirable to have the lighter liquid present as the continuous phase during an agitation step regardless of their relative feed rates to the extractor.

In accordance with the apparatus and method of the present invention, the above-mentioned disadvantages are overcome. For example, in the apparatus to be described herein, it is possible to have a feed rate of a first liquid which is only a fraction of the feed rate of the second liquid and yet have the first liquid as the continuous phase in the mixing zones. Thus, emulsion formation problems may be overcome regardless of the ratio of feed rates to the extractor. In addition, the mixer-settler units in the apparatus of the present invention are so constructed and arranged as to eliminate the necessity for a large amount of piping when transferring liquids between various elements of the extractor. Also, it is possible to control the flow of liquids within the apparatus of the present invention in such a manner that optimum results may be achieved.

It is an object of the present invention to provide improved liquid-liquid contacting apparatus of the mixer-settler type and which is of a simplified design.

It is still a further object of the present invention to provide improved liquid-liquid contacting apparatus of the mixer-settler type with improved controls.

It is still a further object of the present invention to provide improved liquid-liquid contacting apparatus of the mixer-settler type whereby the volume ratio of the various liquids in the mixing zones may be controlled.

It is still a further object of the present invention to provide a novel and compact arrangement of mixer-settlers in a horizontal extractor whereby it is possible to provide for a given liquid being present as the continuous phase while within the mixing zones even though the liquid is supplied in a minor amount to the extractor.

Still other objects of the present invention and the advantages thereof will be apparent from the following detailed description and the drawings, wherein:

FIGURE 1 is a diagrammatic plan view of a presently preferred embodiment of liquid-liquid contacting apparatus constructed in accordance with the present invention;

FIGURE 2 is a diagrammatic sectional view taken along line 2—2 of FIGURE 1;

FIGURE 3 is a diagrammatic sectional view taken along line 3—3 of FIGURE 1;

FIGURE 4 is a diagrammatic sectional view taken along line 4—4 of FIGURE 1;

FIGURE 5 is a diagrammatic sectional view taken along line 5—5 of FIGURE 1;

FIGURE 6 is an enlarged diagrammatic plan view of a typical adjustable weir illustrated in FIGURE 1; and FIGURE 7 is a diagrammatic view in elevation of the adjustable weir illustrated in FIGURE 6.

Referring now to the drawings, and more particularly to FIGURE 1, the liquid-liquid contacting apparatus generally designated as 10 comprises a cylindrical vessel 11 provided with partitions 14, 15, and 16 which divide vessel 11 into four mixer-settler units 17, 18, 19 and 20. Each mixer-settler unit 17, 18, 19 and 20, in turn, is divided by means of partitions 21, 22, 23 and 24 into mixing zones 25, 26, 27 and 28, and settling zones 29, 30, 31 and 32, respectively. Preferably, the partitions 14, 15 and 16 and the partitions 21, 22, 23 and 24 are constructed and arranged so as to provide mixing zones of approximately equal surface area, and settling zones of approximately equal surface area, with the surface area of a settling zone being several times as great as that of a mixing zone. Heavy liquid is fed to mixing zone 25 via conduit 33 including control valve 37 and is withdrawn from settling zone 32 via conduit 34, while lighter liquid is fed to mixing zone 28 via conduit 35 including control valve 38 and is withdrawn from settling zone 29 via conduit 36.

Each of the mixing zones 25, 26, 27 and 28 is provided with similar agitators 40, airlifts 44, and partitions 45 forming sumps 46. The partitions 45 are provided with similar adjustable weirs 47 for controlling the level of liquid within the mixing zones. In addition, each of the partitions 21, 22, 23 and 24 is provided with similar adjustable weirs 48 for controlling backflow of liquid into the mixing zones 25, 26, 27 and 28 from settling zones 29, 30, 31 and 32, respectively.

FIGURE 2 is a sectional view of a typical mixing zone, and more specifically, a sectional view of mixing zone 26 taken along the line 2—2 of FIGURE 1. The settling zones 29 and 31 contain a lower layer of heavy liquid 49 and an upper layer of immiscible or substantially immiscible lighter liquid 50. The partitions 14 and 15 are provided with overflow weirs 51 and 52, which may be adjusted in height by gate means 53 and 54, respectively, for controlling the liquid levels in the settling zones.

A riser 55 having an intake 56 located near the bottom of vessel 11 feeds heavy liquid 49 from settling zone 29 to weir 51, where it overflows into downcomer 57. The heavy liquid flows through downcomer 57 to discharge 58, which is arranged beneath the eye of agitator 40 in mixing zone 26. Lighter liquid from settling zone 31 overflows weir 52 into downcomer 59. The lighter liquid flows through downcomer 59 to discharge 60, which also is arranged beneath agitator 40 in mixing zone 26. The weirs 51 and 52 are adjusted so as to provide substantially equal hydrostatic heads in riser 55 and settling zone 31. Inasmuch as the density of the heavy and lighter liquids may differ appreciably, it is apparent that the weir 52 controlling overflow of lighter liquid 50 will usually be set at a higher level than weir 51 controlling overflow of heavy liquid 49 so as to provide for substantially equal hydrostatic heads. The heavy and lighter liquids 49 and 50 supplied to mixing zone 26 are subjected to vigorous agitation by means of mechanically driven agitator 40, thereby intimately contacting the two liquids and forming a mixture 65 of the heavy and lighter liquids within the mixing zone 26.

Referring now to FIGURE 3, the partition 45 forming sump 46 is provided with an overflow weir 47 which is adjusted by gate means 61 so as to assure a liquid level within mixing zone 26 which is substantially less than that of the settling zones 29, 30 and 31. Thus, the mixture 65 of heavy and lighter liquids under agitation in mixing zone 26 readily overflows weir 47 into sump 46. The airlift 44 is provided with an inlet end 62 arranged near the bottom of sump 46, an internally arranged conduit 63 leading to inlet end 62, and discharge 64. A stream of a suitable gas or gaseous mixture which may be air is supplied to airlift 44 via conduit 63, thereby lifting or pumping the mixture 65 from sump 46 upward through airlift 44 and discharge 64 into settling zone 30.

As best seen in FIGURE 1, the weir 48 in partition 22 controls backflow of liquid contained in settling zone 30 to mixing zone 26. When desirable, the weir 48 may be adjusted so as to provide for a backflow of lighter liquid 50 from settling zone 30 into mixing zone 26 which is sufficient to result in the lighter liquid phase being continuous within mixing zone 26. This arrangement provides for the lighter liquid being the continuous phase within the mixing zones regardless of the relative feed rates of the heavy and lighter liquids to vessel 11. The mixture 65 discharged into settling zone 30 separates into the heavy and lighter liquids 49 and 50 as it flows slowly toward the end of settling zone 30 remote from mixing zone 26. Then, the lighter liquid overflows into the next preceding mixing zone 25, while the heavy liquid is passed to the next succeeding mixing zone 27.

All of the mixing zones with the exception of the first mixing zone to which heavy liquid is fed and the last mixing zone to which lighter liquid is fed may be of similar construction and design, such as described for mixing zone 26. The first mixing zone, i.e. mixing zone 25, does not require a riser 55 and weir 51 such as described for mixing zone 26, and these elements may be omitted and the heavy liquid fed directly to a downcomer such as 57. Similarly, the weir 52 may be omitted in the last mixing zone, i.e., mixing zone 28, and the lighter liquid fed directly to a downcomer similar to downcomer 59, with the last mixing zone otherwise being of a construction and design similar to that described for mixing zone 26.

As best seen in FIGURE 4, heavy liquid 49 in settling zone 32 passes upward in riser 70 and overflows weir 71, which is adjustable by gate means 72, into downcomer 73. The heavy liquid passes through downcomer 73 and is withdrawn from vessel 11 by conduit 34.

Referring now to FIGURE 5, the lighter liquid 50 in settling zone 29 overflows adjustable end portion 77 of conduit 36 and is withdrawn from vessel 11. The end portion 77 is retained at a desired level on conduit 36 by means of set screw 79.

FIGURES 6 and 7 illustrate a typical adjustable weir suitable for use throughout the apparatus disclosed herein and specifically those at 48. The partitions 21, 22, 23 and 24 each has a notch through which liquid may flow provided with a gate 82 for adjustment of the resulting weir 81. Each partition is also provided with guide brackets 83 which are constructed and arranged so as to allow easy vertical sliding movement of gate 82. Set screws 84 carried by brackets 83 are provided for retaining gate 82 at a desired level.

Preferably, weirs controlling the liquid level in the settling zones are adjusted so as to maintain substantially the same liquid level in each of the settling zones.

From the foregoing, it will be apparent that in over-all operation the light and heavy liquids are flowing in countercurrent relationship through cylindrical vessel 11. However, with respect to any given mixer-settler unit 17, 18, 19 and 20, the flow is cocurrent with the exception of backflow via weirs 48. Thus, heavy liquid 49 entering vessel 11 via conduit 33 passes through vessel 11 via mixing zone 25, settling zone 29, mixing zone 26, settling zone 30, mixing zone 27, settling zone 31, mixing zone 28, and settling zone 32, and is then withdrawn from settling zone 32 via conduit 34. Similarly, the lighter liquid 50 enters cylindrical vessel 11 via conduit 35 and passes through vessel 11 via mixing zone 28, settling zone 32, mixing zone 27, settling zone 31, mixing zone 26, settling zone 30, mixing zone 25, and settling zone 29, and is then withdrawn from settling zone 29 via conduit 36.

The operation of the apparatus above described may be more readily understood in connection with the use of the same in a hydrometallurgical process for the solvent extraction of metal values from an aqueous leach liquor. For purposes of illustration, the heavy liquid may be an aqueous leach liquor containing vanadium values which may be prepared by leaching a suitable vanadium ore in accordance with prior art practice. The lighter liquid may be an organic extractant for the vanadium values in the leach liquor, such as a 10% solution of di-2-ethylhexyl phosphoric acid in kerosene.

When extracting an aqueous leach liquor containing vanadium values with an organic solvent such as above described, the various weirs in the apparatus are adjusted to maintain the desired level of liquid within the settling zones and leach liquor is fed at a desired feed rate to vessel 11 via conduit 33, and more specifically to mixing zone 25. When the mixing zone 25 is filled with leach liquor and the leach liquor begins to spill over weir 47 into sump 46, the airlift 44 is placed in operation and the leach liquor pumped into settling zone 29. The leach liquor flows from settling zone 29 to mixing zone 26, and the foregoing operation is continued with each of the succeeding mixing and settling zones until all are filled to the desired level with leach liquor, and leach liquor is being withdrawn from settling zone 32 via conduit 34. Then, organic solvent is fed to mixing zone 28 via conduit 35. The relative feed rates of leach liquor and organic solvent may be in any desired ratio, such as about 2 volumes of leach liquor for each volume of organic solvent. As the organic solvent is fed into mixing zone 28, the agitator 44 is placed in operation. The agitation is sufficiently violent to assure intimate contact between the organic solvent and the leach liquor while within mixing zone 28. The resulting mixture of leach liquor and organic solvent overflows weir 47 into sump 46 and is transferred by means of airlift 44 into settling zone 32, where it separates into a heavier leach liquor phase and a lighter organic solvent phase. The organic solvent is then passed through succeeding mixer zones, with the agitators 40 in each mixing zone being placed in operation at the time the solvent reaches the mixing zone. In general, the various weirs throughout the system are adjusted so as to maintain a desired level of liquid within the various settling zones, which preferably should be approximately the same throughout the apparatus. When the organic solvent reaches settling zone 29, it is withdrawn therefrom via conduit 36. The vanadium values originally present in the leach liquor fed to vessel 11 are largely present within the organic solvent and may be recovered therefrom by a conventional stripping process. If desired, further steps may be carried out on the concentrate of metal values thus obtained to produce a commercial product containing vanadium.

Once the system is in equilibrium, and all of the weirs are adjusted so as to allow proper liquid flow and maintain substantially the same liquid level throughout the settling zones, further adjustment generally is not necessary. In fact, the apparatus requires very little attention other than in assuring that the airlifts 44 and agitators 40 are operating properly.

Since it is desired to have a continuous organic solvent phase while within the mixing zones for the purpose of preventing emulsion formation, the backflow weirs 48 are adjusted so as to provide for a backflow of organic phase into the mixing zones which is sufficient to assure the organic phase being continuous while the two liquids are within the mixing zones. Thus, preferably, the mixture being removed from sump 46 by airlift 44 contains the organic solvent as a continuous phase, and this may be effected even though the leach liquor is supplied at the rate of two volumes of leach liquor for each volume of organic solvent. Operating in this manner allows quick and clean separation of the two phases while within the settling zones. The leach liquor then may be passed to a next succeeding mixing zone, while a portion of the organic phase may be passed to the next preceding mixing zone and a portion backflowed into the mixing zone from which it was pumped.

The foregoing detailed description and the accompanying drawing are for purposes of illustration only and are not intended as being limiting to the appended claims.

What is claimed is:

1. Apparatus for contacting heavy liquid with a substantially immiscible lighter liquid comprising vessel means for containing liquids, a plurality of partition means dividing the vessel horizontally into at least first, intermediate and last mixing chambers, pumping chambers and settling chambers, liquid agitation means mounted in the mixing chambers, the mixing chambers, pumping chambers and settling chambers being arranged in series whereby one of the heavy and lighter liquids flows alternately through mixing, pumping and settling chambers and the other liquid flows countercurrent thereto, at least the intermediate mixing chamber being adjacent at least three settling chambers and being separated therefrom by the partition means, at least the intermediate pumping chamber being adjacent the intermediate mixing and settling chambers and separated therefrom by the partition means, means for passing heavy liquid into the first mixing chamber, means for passing lighter liquid into the last mixing chamber, means for withdrawing lighter liquid from the first settling chamber, means for withdrawing heavy liquid from the last settling chamber, and means for passing the heavy and lighter liquids between their respective means for passage into the first and last mixing chambers and their respective means for withdrawal from the last and first settling chambers including the first, intermediate and last mixing, pumping and settling chambers, the means for passing the heavy and lighter liquids being operative to maintain the liquid levels in the first, intermediate and last mixing chambers below the liquid levels in the first, intermediate and last settling chambers, the means for passing the heavy and lighter liquids also including means for withdrawing heavy liquid from the first settling chamber and passing it into the intermediate mixing chamber, means for withdrawing lighter liquid from the last settling chamber and passing it into the intermediate mixing chamber, means including an opening in the partition means separating the intermediate mixing and pumping chambers arranged below the normal liquid level in the intermediate settling chamber whereby the heavy and lighter liquids overflow from the intermediate mixing chamber through the opening into the intermediate pumping chamber to thereby maintain a lower liquid level in the intermediate mixing chamber than in the intermediate settling chamber, and means for pumping liquid from the intermediate pumping chamber into the intermediate settling chamber whereby the heavy and lighter liquids overflowing into the pumping chamber are passed upward to the higher liquid level in the intermediate settling chamber.

2. Apparatus for contacting heavy liquid with a substantially immiscible lighter liquid comprising vessel means for containing liquids, a plurality of partition means dividing the vessel horizontally into at least first, intermediate and last mixing chambers, pumping chambers and settling chambers, liquid agitation means mounted in the mixing chambers, the mixing chambers, pumping chambers and settling chambers being arranged in series whereby one of the heavy and lighter liquids flows alternately through mixing, pumping and settling chambers and the other liquid flows countercurrent thereto, at least the intermediate mixing chamber being adjacent at least three settling chambers and being separated therefrom by the partition means, at least the intermediate pumping chamber being adjacent the intermediate mixing and settling chambers and separated therefrom by the partition means, means for passing heavy liquid into the first mixing chamber, means for passing lighter liquid into the last mixing chamber, means for withdrawing lighter liquid from the first settling chamber, means for withdrawing heavy liquid from the last settling chamber, means for passing the heavy and lighter liquids between their respective means for passage into the first and last mixing chambers and their respective means for withdrawal from the last and first settling chambers including the first, intermediate and last mixing, pumping and settling chambers, the means for passing the heavy and lighter liquids being operative to maintain the liquid levels in the first, intermediate and last mixing chambers below the liquid levels in the first, intermediate and last settling chambers, the means for passing the heavy and lighter liquids also including means for withdrawing heavy liquid from the first settling chamber and passing it into the intermediate mixing chamber, means for withdrawing lighter liquid from the last settling chamber and passing it into the intermediate mixing chamber, means including a first opening in the partition means separating the intermediate mixing and pumping chambers arranged below the normal liquid level in the intermediate settling chamber whereby the heavy and lighter liquids overflow from the intermediate mixing chamber through the first opening into the intermediate pumping chamber to thereby maintain a lower liquid level in the intermediate mixing chamber than in the intermediate settling chamber, and means for pumping liquid from the intermediate pumping chamber into the intermediate settling chamber whereby the heavy and lighter liquids overflowing into the pumping chamber are passed upward to the higher liquid level in the intermediate settling chamber, and means including a second opening in the partition means separating the intermediate mixing and settling chambers whereby a portion of the lighter liquid pumped from the intermediate pumping chamber is returned from the intermediate settling chamber to the intermediate mixing chamber by overflowing through the second opening.

3. Apparatus for contacting heavy liquid with a substantially immiscible lighter liquid comprising vessel means for containing liquids, a plurality of partition means dividing the vessel horizontally into at least first, intermediate and last mixing chambers, pumping chambers and settling chambers, liquid agitation means mounted in the mixing chambers in spaced relationship with the bottom, the mixing chambers, pumping chambers and settling chambers being arranged in series whereby one of the heavy and lighter liquids flows alternately through mixing, pumping and settling chambers and the other liquid flows countercurrent thereto, at least the intermediate mixing chamber being adjacent at least three settling chambers and being separated therefrom by the partition means, at least the intermediate settling chamber being adjacent at least three mixing chambers and being separated therefrom by the partition means, at least the intermediate pumping chamber being adjacent the intermediate mixing and settling chambers and separated therefrom by the partition means, means for passing heavy liquid into the first mixing chamber, means for passing lighter liquid into the last mixing chamber, means for withdrawing lighter liquid from the first settling chamber, means for withdrawing heavy liquid from the last settling chamber, and means for passing the heavy and lighter liquids between their respective means for passage into the first and last mixing chambers and their respective means for withdrawal from the last and first settling chambers including the first, intermediate and last mixing, pumping and settling chambers, the means for passing the heavy and lighter liquids being operative to maintain the liquid levels in the first, intermediate and last mixing chambers below the liquid levels in the first, intermediate and last settling chambers, the means for passing the heavy and lighter liquids also including underflow conduit means for withdrawing heavy liquid from the first settling chamber and passing it into the intermediate mixing chamber under the agitation means and overflow conduit means for withdrawing lighter liquid from the last settling chamber and passing it into a lower portion of the intermediate mixing chamber under the agitation means whereby the liquids pass upward in the intermediate mixing chamber past the agitation means and are agitated thereby, means including an opening in the partition means separating the intermediate mixing and pumping chambers arranged below the normal liquid level in the intermediate settling chamber whereby the agitated heavy and lighter liquids overflow through the opening into the intermediate pumping chamber to thereby maintain a lower liquid level in the intermediate mixing chamber than in the intermediate settling chamber, and means for pumping liquid from the intermediate pumping chamber into the intermediate settling chamber whereby the agitated heavy and lighter liquids overflowing into the pumping chamber are passed upward to the higher liquid level in the intermediate settling chamber.

4. Apparatus for contacting heavy liquid with a substantially immiscible lighter liquid comprising vessel means for containing liquids, a plurality of partition means dividing the vessel horizontally into at least first, intermediate and last mixing chambers, pumping chambers and settling chambers, liquid agitation means mounted in the mixing chambers in spaced relationship with the bottom, the mixing chambers, pumping chambers and settling chambers being arranged in series whereby one of the heavy and lighter liquids flows alternately through mixing, pumping and settling chambers and the other liquid flows countercurrent thereto, at least the intermediate mixing chamber being adjacent at least three settling chambers and being separated therefrom by the partition means, at least the intermediate settling chamber being adjacent at least three mixing chambers and being separated therefrom by the partition means, at least the intermediate pumping chamber being adjacent the intermediate mixing and settling chambers and separated therefrom by the partition means, means for passing heavy liquid into the first mixing chamber, means for passing lighter liquid into the last mixing chamber, means for withdrawing lighter liquid from the first settling chamber, means for withdrawing heavy liquid from the last settling chamber, means for passing the heavy and lighter liquids between their respective means for passage into the first and last mixing chambers and their respective means for withdrawal from the last and first settling chambers including the first, intermediate and last mixing, pumping and settling chambers, the means for passing the heavy and lighter liquids being operative to maintain the liquid levels in the first, intermediate and last mixing chambers below the liquid levels in the first, intermediate and last settling chambers, the means for passing the heavy and lighter liquids also including underflow conduit means for withdrawing heavy liquid from the first settling chamber and passing it into the intermediate mixing chamber under the agitation means, and overflow conduit means for withdrawing lighter liquid from the last settling chamber and passing it into a lower portion of the intermediate mixing chamber under the agitation means whereby the liquids pass upward in the intermediate mixing chamber past the agitation means and are agitated thereby, means including a first opening in the partition means separating the intermediate mixing and pumping chambers arranged below the normal liquid level in the intermediate settling chamber whereby the agitated heavy and lighter liquids overflow through the first opening into the intermediate pumping chamber to thereby maintain a lower liquid level in the intermediate mixing chamber than in the intermediate settling chamber, and means for pumping liquid from the intermediate pumping chamber into the intermediate settling chamber whereby the agitated heavy and lighter liquids overflowing into the pumping chamber are passed upward to the higher liquid level in the intermediate settling chamber, and means including a second opening in the partition means separating the intermediate mixing and settling chambers whereby a portion of the lighter liquid pumped from the intermediate pumping chamber is returned from the intermediate settling chamber to the intermediate mixing chamber by overflowing through the second opening.

5. Apparatus for contacting heavy liquid with a substantially immiscible lighter liquid comprising vessel means for containing liquids, a plurality of partition means dividing the vessel horizontally into at least first, intermediate and last mixing chambers, pumping chambers and settling chambers, liquid agitation means mounted in the mixing chambers in spaced relationship with the bottom, the mixing chambers, pumping chambers and settling chambers being arranged in series whereby one of the heavy and lighter liquids flows alternately through mixing, pumping and settling chambers and the other liquid flows countercurrent thereto, at least the intermediate mixing chamber being adjacent at least three settling chambers and being separated therefrom by the partition means, at least the intermediate settling chamber being adjacent at least three mixing chambers and being separated therefrom by the partition means, at least the intermediate pumping chamber being adjacent the intermediate mixing and settling chambers and separated therefrom by the partition means, means for passing continuously a controlled volume of heavy liquid into the first mixing chamber, means for passing continuously a controlled volume of lighter liquid into the last mixing chamber, means for withdrawing continuously lighter liquid from the first settling chamber, means for withdrawing continuously heavy liquid from the last settling chamber, adjustable means for passing the heavy and lighter liquids between their respective means for passage into the first and last mixing chambers and their respective means for withdrawal from the last and first settling chambers including the first, intermediate and last mixing, pumping and settling chambers whereby desired liquid levels are maintained therein, the means for passing the heavy and lighter liquids being operative to maintain the liquid levels in the first, intermediate and last mixing chambers below the liquid levels in the first, intermediate and last settling chambers, the means for passing the heavy and lighter liquids also including adjustable underflow conduit means for withdrawing a controlled amount of heavy liquid from the first settling chamber and passing it into the intermediate mixing chamber under the agitation means, and adjustable overflow conduit means for withdrawing a controlled amount of lighter liquid from the last settling chamber and passing it into a lower portion of the intermediate mixing chamber under the agitation means whereby the liquids pass upward in the intermediate mixing chamber past the agitation means and are agitated thereby, means including an adjustable first opening in the partition means separating the intermediate mixing and pumping chambers arranged below the normal liquid level in the intermediate settling chamber whereby a controlled amount of the agitated heavy and lighter liquids overflow through the first opening into the intermediate pumping chamber to thereby maintain a lower liquid level in the intermediate mixing chamber than in the intermediate settling chamber, and means for pumping liquid from the intermediate pumping chamber into the intermediate settling chamber whereby the agitated heavy and lighter liquids overflowing into the pumping chamber are passed upward to the higher liquid level in the intermediate settling chamber, and means including an adjustable second opening in the partition means separating the intermediate mixing and settling chambers whereby a controlled portion of the lighter liquid pumped from the intermediate pumping chamber is returned from the intermediate settling chamber to the intermediate mixing chamber by overflowing through the second opening, the adjustable underflow conduit, overflow conduit, first opening and second opening being adjusted whereby the liquid levels in the first, intermediate and last settling chambers are maintained in substantially the same plane and the liquid levels in the first, intermediate and last mixing and pumping chambers are at a lower level.

6. Apparatus for contacting a relatively heavier liquid with a substantially immiscible relatively lighter liquid, comprising means defining first and second mixing chambers and first and second settling chambers, liquid agitators disposed in the mixing chambers, liquid transfer means including first conduit means for transferring heavier liquid progressively from the first mixing chamber to the first settling chamber and then to the second mixing chamber and then to the second settling chamber, the liquid transfer means including second conduit means for transferring lighter liquid progressively from the second mixing chamber to the second settling chamber and then to the first mixing chamber and then to the first settling chamber, said second conduit means having overflow intake means disposed in the lighter liquid phase in a settling chamber to admit overflow lighter liquid into said second conduit means, the liquid transfer means also including third conduit means for transferring mixed heavier and lighter liquids from the first mixing chamber to the first settling chamber and from the second mixing chamber to the second settling chamber, means for adjustably altering the cross-sectional area of at least a portion of said first conduit means thereby selectively to alter the flow rate of heavier liquid through said first conduit means, and means for adjustably altering the overflow intake area of the intake of said second conduit means thereby selectively to alter the flow rate of lighter liquid through said second conduit means.

7. Apparatus for contacting a relatively heavier liquid with a substantially immiscible relatively lighter liquid, comprising means defining first and second mixing chambers and first and second settling chambers, liquid agitators disposed in the mixing chambers, liquid transfer means including first conduit means for transferring heavier liquid progressively from said first mixing chamber to said first settling chamber and then to said second mixing chamber and then to said second settling chamber, the liquid transfer means including second conduit means for transferring lighter liquid progressively from said second mixing chamber to said second settling chamber and then to said first mixing chamber and then to said first settling chamber, the liquid transfer means including third conduit means for transferring mixed heavier and lighter liquids from said first mixing chamber to said first settling chamber and from said second mixing chamber to said second settling chamber, overflow intake means for returning lighter liquid from a settling chamber to a mixing chamber which is upstream relative to the direction of lighter liquid movement, means for adjustably altering the cross-sectional area of at least a portion of said overflow intake means thereby selectively to alter the rate of upstream return of lighter liquid, and means for adjustably altering the cross sectional area of at least a portion of said first conduit means thereby selectively to alter the flow rate of heavier liquid through said first conduit means.

8. Apparatus as claimed in claim 7, and means for adjustably altering the cross-sectional area of at least a portion of said second conduit means thereby selectively to alter the flow rate of lighter liquid through said second conduit means.

9. In a method of contacting a relatively heavier liquid with a substantially immiscible relatively lighter liquid in first and second mixing chambers provided with liquid agitators and in first and second settling chambers, in which heavier liquid is transferred progressively at a controlled rate from the first mixing chamber to the first settling chamber and then to the second mixing chamber and then to the second settling chamber and lighter liquid is transferred progressively from the second mixing chamber to the second settling chamber and then to the first mixing chamber and then to the first settling chamber with the lighter liquid having an exposed surface in the settling chambers that is an interface between the lighter liquid and the ambient atmosphere, and in which a mixture of heavier and lighter liquids is transferred from the first mixing chamber to the first settling chamber and from the second mixing chamber to the second settling chamber; the improvement comprising returning lighter liquid from adjacent said exposed surface to a mixing chamber which is upstream relative to the direction of lighter liquid movement, in such quantity as to maintain the lighter liquid as a continuous phase in the mixing chambers with the heavier liquid dispersed therein.

10. The method of claim 9 wherein the lighter liquid is transferred progressively at a controlled rate from the second mixing chamber to the second settling chamber and then to the first mixing chamber and then to the first settling chamber.

References Cited by the Examiner

UNITED STATES PATENTS

| 2,084,342 | 6/37 | Houghton | 23—270.5 |
| 2,682,453 | 6/54 | Holder | 23—270.5 |
| 2,701,753 | 2/55 | Eisenlohr et al. | 23—270.5 X |
| 2,743,999 | 5/56 | Binswanger | 23—310 |
| 2,754,179 | 7/56 | Whatley | 23—270.5 X |
| 2,775,543 | 12/56 | Carver | 23—270.5 |
| 2,845,936 | 8/58 | Boynton et al. | 23—270.5 |

NORMAN YUDKOFF, *Primary Examiner.*

GEORGE D. MITCHELL, *Examiner.*